Dec. 7, 1971  F. R. PALMER  3,624,966
MEANS FOR MARKING GLASS AND THE LIKE
Filed Nov. 27, 1968  2 Sheets-Sheet 2
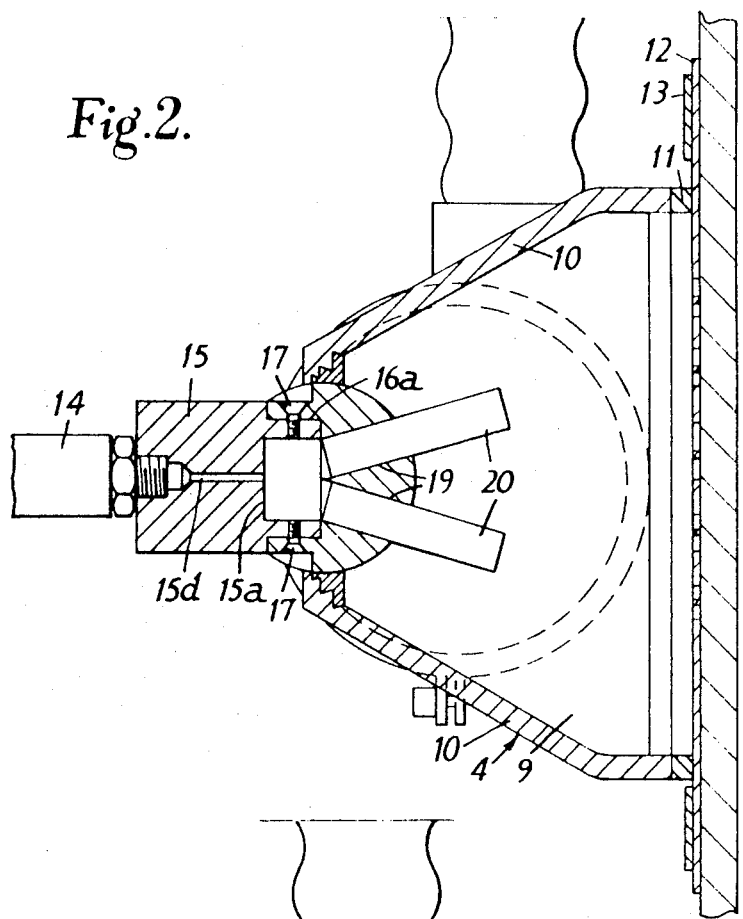
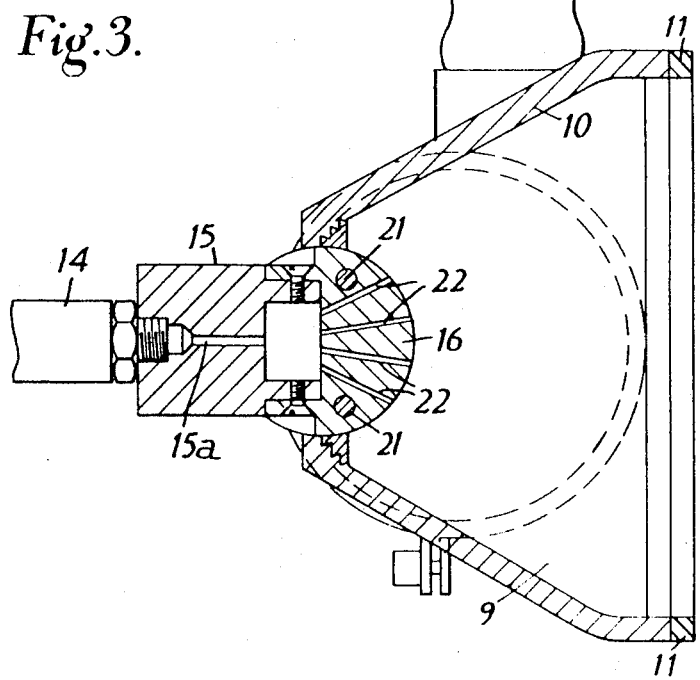

3,624,966
MEANS FOR MARKING GLASS AND THE LIKE

Francis R. Palmer, deceased, late of Leicester, England, by Peter R. Palmer and Shelia Bruce, executors, Leicester, England, assignors to Thomas Edward Boynton, Leicester, England
Filed Nov. 27, 1968, Ser. No. 779,321
Claims priority, application Great Britain, July 20, 1968, 34,741/68
Int. Cl. B24c *3/06*
U.S. Cl. 51—8        8 Claims

ABSTRACT OF THE DISCLOSURE

Portable spraying appliance for etching glass to the form of a stencil to mark e.g. a vehicle's registration number on its windows as an anti-theft precaution. Comprises a spray gun for spraying abrasive powder into one end of a casing at the other end of which, one or more stencils are located or to be located. Stencil(s) either mounted in a holder on the casing or preferably taped to the surface to be marked. In latter event, casing is open ended and is in use placed over stencil(s) while gun is operated.

Figure 1:
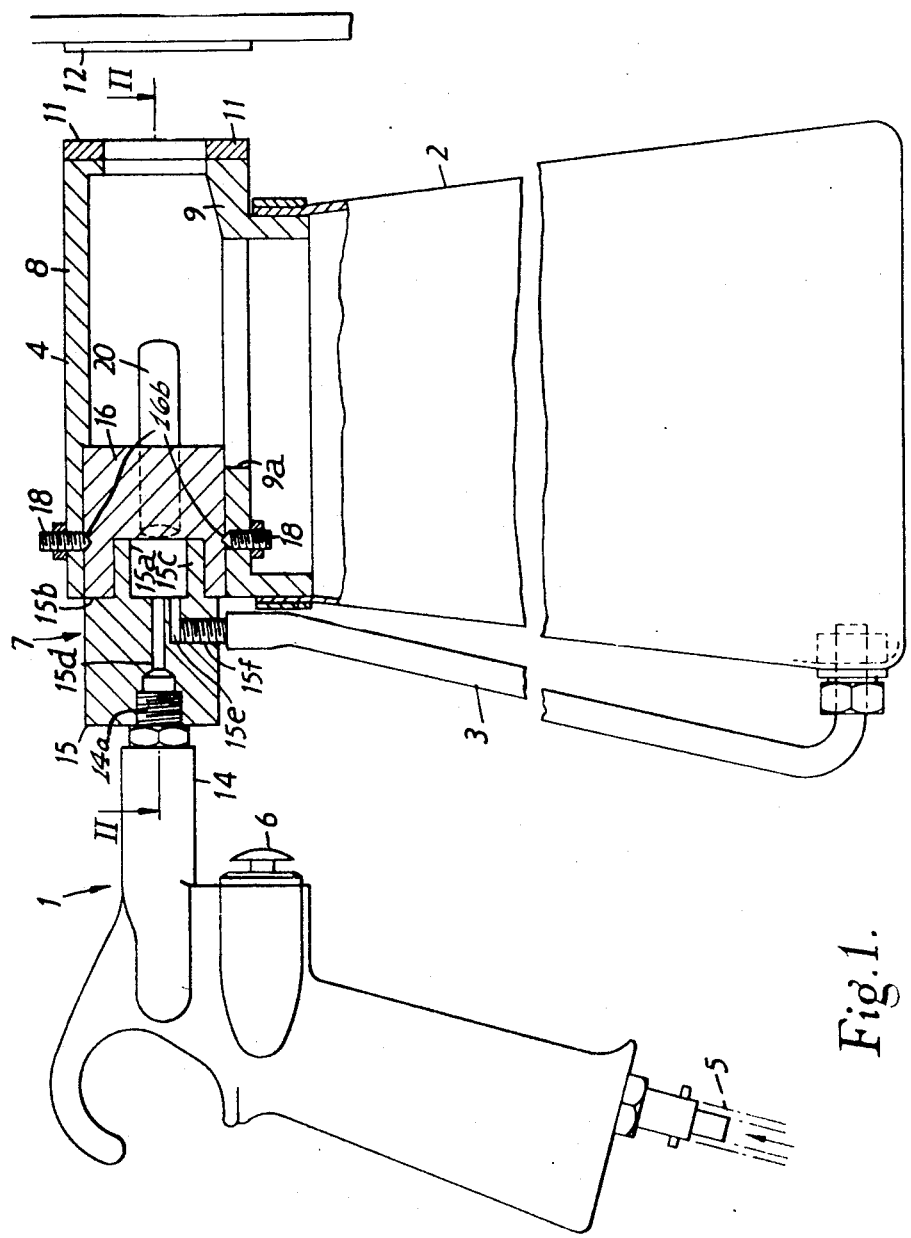

Gun includes nozzles for spraying into casing. May be plurality of nozzles swivellable to direct abrasive from side to side in casing, or one or more fixed nozzles.

---

This invention relates to the marking of glass and like hard substances. For convenience, reference will hereinafter be confined to the marking of glass, although it is to be clearly understood that the invention is also applicable to the marking of like relatively hard substances.

Now glass frequently requires to be permanently marked. For example glass articles require to be permanently marked with trademarks, legends and like information.

A known method of marking glass is abrading, i.e. spraying with finely-divided abrasive material, the requisite areas of the glass to be marked. Thus, this may be effected by applying to the surface which is to be marked a stencil, i.e. a plate or the like which is apertured to the form of the required marking, and then spraying on to the plate, from a spray gun, a stream of the finely-divided abrasive material.

Manifestly, such an operation can usually only be effected in the workshop or factory, as otherwise the stream of abrasive would be dispersed. Because of this although there are many instances where permanent marking of glass is desirable, this is not effected because of the difficulty of the operation.

The object of the present invention is to provide means for very quickly and easily permanently marking glass by abrasion in the manner set forth, which means can be used without danger of dispersal of the abrasive.

According to one aspect of the invention, there is provided, a portable appliance comprising a spray gun; a plurality of spray nozzles in said gun, through each of which a stream of abrasive can be emitted; a casing into one end of which said nozzles extend; and means, at the opposite end of the casing to said nozzles, to receive a stencil or stencils, said nozzles being moveable relatively to the casing to enable the streams of abrasive, in use, to be directed successively through different portions of the full width of the stencil or stencils.

The plurality of spray nozzles which are turnable relatively to the duct or casing in accordance with this aspect of the invention in use produce an intensive curtain of spray which can be swept across the stencils from end to end thereof. This spray ensures that the stencil or stencils is or are evenly sprayed and makes for an even marking of the surface concerned.

In accordance with a different aspect of the present invention however, the spray gun has one or more spray nozzles through which streams of abrasive can be emitted, said nozzles extending into one end of a duct or casing, at or adjacent the opposite end of which a stencil or stencils is or are located or to be located, said nozzles being fixed relatively to the duct or casing so that in use, the or each of said streams is directed toward the stencil or stencils or towards a specific part thereof.

Since a spraying appliance constructed in accordance with this embodiment has one or more nozzles fixed in relation to the duct or casing, so obviating the need to turn the spray gun relatively to the latter, a plurality of marking operations can be performed in rapid succession, the time taken to turn the nozzles relatively to the duct or casing being saved.

The appliance constructed in accordance with either aspect of this invention may employ a stencil carrier attached to the outer end of the duct or casing. However, in use, such a carrier has the disadvantage that if it is found after the appliance has been used to mark a surface, that the marking is not uniform over its whole extent, the stencil(s) cannot easily be repositioned in register with the marking on the surface if it is desired to repeat the marking operation. In accordance with the present invention therefore, the end of the duct or casing remote from the spray gun is preferably open, the part of the duct or casing defining the opening being in use positioned around a stencil secured to the surface to be marked and separate from the appliance.

The idea is that the stencil or stencils are secured to the surface to be marked, e.g. by pressure sensitive tape and the open end of the appliance is placed over the stencil(s). If, after the appliance has been operated, the marking is not found to be uniform the appliance, can, in this case, be replaced over the stencil(s) and the operation repeated.

It is primarily the intention that a finely-powdered abrasive material such as fine sand, Carborundum or the like shall be sprayed onto the glass, i.e. blown on a stream of air, although it is possible that an emulsion, with such a powdered material in suspension in a liquid, might also be employed.

Now, as will be readily appreciated the present invention provides a portable appliance which enables glass and the like to be very easily and quickly marked to the form of the stencil(s). Thus, with the stencil(s) of the appliance applied to a surface to be marked a short burst, e.g. of only a few seconds, of a stream of abrasive material will quickly and permanently mark the glass.

This simple method will not only enable all the various well known applications of permanent marking upon glass to be more quickly and easily effected than hitherto, but will enable glass to be marked in situations where this has not previously been possible or convenient in view of the difficulties attendant upon the conventional methods of marking glass.

For example, it has been realised that if one or more of the glass windows of a motor car or other vehicle were permanently and indelibly marked with the license registration number of the vehicle or a similar means of identification, it would be extremely difficult, should the car or vehicle be stolen, to prevent subsequent identification of the vehicle. Assuming that the marking upon the window were indelible, the only method of avoiding identification of a stolen vehicle would be to replace the windows—a difficult and time-consuming task.

This idea has not previously been adopted because of the difficulty of efficiently marking the windows. However, the present invention has been primarily, although by no means exclusively, evolved for this purpose. Thus, with the appliance provided by the invention one or more or all of the windows of a motor car or other vehicle could be easily and quickly marked with an identification legend or symbol, for example by the garage supplying the car and the license registration number plates. The legend or symbol marked on the windows could be the same as the license registration number or could be a different identification symbol.

In order that the invention may be more clearly understood and readily carried into practical effect, specific embodiments thereof will now be described by way of example, with reference to the accompanying drawings in which:

FIG. 1 is a partial vertical sectional view of an appliance constructed according to a first embodiment of the invention, the appliance being shown in a position prior to its application to a glass surface to mark the same, FIG. 2 is a horizontal sectional view taken on line II—II of FIG. 1, and FIG. 3 is a similar view to FIG. 2, showing a second embodiment.

The appliance shown in FIG. 1 comprises a spray gun, generally designated 1 which draws abrasive material to be sprayed, from a container 2 through a flexible suction tube 3 and sprays it into an outwardly flared casing 4, from where it passes on to the surface to be marked, as will be described. The spray gun 1 is adapted to be supplied with compressed air along an input line indicated in chain lines at 5 to provide an air stream for carrying the particles of abrasive. A plunger 6 on the gun controls the air supply to nozzle means generally designated 7 mounted in the rear end of the casing 4, where abrasive material drawn up tube 3 by the air stream, is picked up by the latter and is sprayed into the casing 4.

The two different embodiments of the invention illustrated respectively in FIGS. 1 and 2, and in FIG. 3 of the accompanying drawings, differ from one another only as regards the nozzle means 7 and therefore the description of the remainder of the appliance is made with reference to both embodiments.

As can be seen from the drawings, the casing 4 is of progressively increasing width from its rear end, which is closed by the nozzle means 7, to its front end which is open. It is of rectangular shape in cross-section and comprises a plane top 8, a plane bottom 9 and complementary sides 10. The open front end of the casing is framed by a rectangular-section sealing strip 11 of rubber or other resilient material, which seals against a surface to which the casing is applied when the appliance is in use. This prevents abrasive material escaping into the atmosphere, which could manifestly be dangerous. The above-mentioned plane bottom 9 of the casing has an aperture 9a therein, through which the abrasive material is returned to the container 2 after contacting the surface concerned during the spraying operation.

In a preferred arrangement, the stencil or stencils, designated 12 in the accompanying drawings, is or are secured directly to the surface to be marked e.g. by pressure sensitive tape 13. The appliance is then manually placed on the surface by an operator holding the gun 1 such that the sealing strip 11 surrounds the stencil(s) or at least the cut-out portions of the latter and is compressed against the surface concerned or against the margins of the stencil(s), whereby the strip 11 is a means for receiving the stencil or stencils. Alternatively, a stencil holder (not shown) may be provided at the front end of the casing 4 and be bordered by a sealing strip similar to strip 11. The appliance is then operated by depressing the plunger 6 on the spray gun to mark the surface in accordance with the stencil(s). As noted above, the strip 11 may surround an area including one stencil or more than one stencil. For convenience, the stencil or stencils surrounded by the sealing strip 11 will be referred to sometimes hereinafter collectively as the stencil device.

Spray gun 1 includes a forwardly projecting barrel portion 14 which has a screw-threaded projection 14a at its front end. Projection 14a is screwed into a complementary axial bore formed in the rear end of a cylindrical component 15. A large diameter counterbore 15a is provided at the front end of component 15 and this end is also provided with a continuous outer rebate 15b which encircles the component and, with counterbore 15a defines an annular flange 15c on the latter. An axial air passageway 15d is formed through component 15 (see FIG. 1) and a further short passageway 15e extends rearwardly of the latter parallel to passageway 15d, communicating at one end with counterbore 15a and at the other with the outer end of a tapped radial hole 15f which receives a nipple forming a connection for the flexible tube 3.

A nozzle block 16 is mounted in the casing and is formed at its rear end with a counterbore 16a which receives the above-mentioned annular flange 15c on component 15, the flange being retained in the counterbore by a pair of retaining screws 17.

As already stated, the preceding description applies both to the embodiment shown in FIGS. 1 and 2 and to that shown in FIG. 3. However, reference will now be directed solely to the example shown in FIGS. 1 and 2. The nozzle block 16 in this case is formed in its upper and lower faces with aligned recesses 16b, each of which receives the end of one of a pair of aligned pivot screws 18 screwed into tapped holes in the top 8 and bottom 9 of casing 4. As can be seen from FIG. 2, block 16 is of part circular shape in plan having a flattened face at one side, i.e. the side in which the counterbore 16a is formed, and is of constant height. A pair of relatively-inclined bores 19 are formed in the block 16 with their axes parallel to the top and bottom faces of the latter, the outer ends of the bores emerging in the curved face of the block and pointing towards the open end of the casing 4. Each bore 19 receives a hollow tube 20 with a push fit. These tubes constitute jet nozzles and are each inwardly bevelled at each end.

With the appliance illustrated in FIGS. 1 and 2 of the drawings in use, the front end of the casing is placed over a stencil or stencils taped to the surface to be marked so that the sealing strip 11 seals the interior of the casing around the stencil(s), and plunger 6 on the spray gun is operated. This directs a jet of compressed air into the cavity 15a and causes abrasive material to be sucked up the tube 3 from the container 2 and into the air stream. The abrasive-carrying air then passes along the tubes 20 and is projected along inside the casing 4 at high velocity towards the stencil(s) located adjacent its front end. The gun 1 can also be turned relatively to the casing, about the aligned pivot screws 17 to cause the sprays issuing from the tubes 20 to sweep the stencil(s) from side to side.

Turning now to the embodiment of the invention illustrated in FIG. 3 of the drawings, the arrangement is the same as that described in relation to FIGS. 1 and 2, with two exceptions. Firstly, the nozzle block 16 is bolted to the casing 4 by two bolts indicated in section at 21, each bolt passing vertically through the top 8 and the bottom 9 of the casing 4 adjacent the respective sides of the block 16. This prevents the spray gun turning relatively to the casing. The second difference is that the nozzle block 16 is formed with four radial bores 22 which extend between the cavity 15a and the curved surface of the block 16 and are directed towards equally-spaced points along the width of the front end of the casing. Thus, in use, with the appliance held in contact with the surface to be marked, as in the first embodiment, the abrasive spray issues from all four bores 22 and forms a continuous wall of spray which impinges on the stencil(s) and on the surface through the latter.

Manifestly, the bores 22 could be provided with tubes constituting nozzles as in the first embodiment, or with other known forms of nozzle elements. Also, the number and arrangement of the bores may be varied. Thus, a single bore with a wide spray nozzle could be used. In some cases it may be found to be advantageous if the number of bores is equal to the number of spaces in the stencil(s).

We claim:

1. A portable appliance comprising a spray gun; a plurality of spray nozzles in said gun, through each of which a stream of abrasive can be emitted; a casing into one end of which said nozzles extend; and means, at the opposite end of the casing to said nozzles, to receive a stencil device, said nozzles being movable relatively to the casing to enable the streams of abrasive, in use, to be directed successively through different portions of the stencil device.

2. An appliance according to claim 1, wherein the end of the casing remote from the spray nozzles is open, whereby the part of the casing defining the opening is, in use, positioned around a stencil device secured to the surface to be marked and separate from the appliance.

3. An appliance according to claim 2, wherein a frame of resilient material is provided at the wide end of the casing, the arrangement being such that the frame is compressed when the appliance is applied to a surface to be marked and forms an air-tight seal surrounding the stencil device.

4. An appliance according to claim 3 wherein the said casing progressively increases in cross-sectional size from a narrow end in which the spray nozzles are located, to a wide end at which the stencil device is adapted to be located.

5. An appliance according to claim 1, wherein at least one spray nozzle is constituted by a bore in a block mounted in the casing, said bore being adapted to be supplied with abrasive from the spray gun.

6. An appliance according to claim 5, wherein the bore in said at least one spray nozzle has a jet tube mounted therein, projecting into the interior of the casing from the surface of the block.

7. An appliance according to claim 1, including a container for a supply of abrasive, which is suspended below the casing and is in communication with the latter, and a suction tube connected between the container and each spray nozzle suchwise that, when the spray gun is supplied with air under pressure abrasive is drawn along the said tube and is picked up by the air stream and issues through the nozzles as a finely-divided stream of abrasive.

8. An appliance according to claim 1, wherein the casing is of rectangular shape in cross-section.

References Cited

UNITED STATES PATENTS

| 955,468 | 4/1910 | Motz | 51—8 |
| 2,133,149 | 10/1938 | Poncelet | 51—8 |
| 2,299,405 | 10/1942 | Prange | 51—8 |
| 2,305,976 | 12/1942 | McKnight | 51—8 |
| 2,487,366 | 11/1949 | Penno | 51—8 X |
| 3,044,218 | 7/1962 | Munn | 51—8 |
| 3,377,749 | 4/1968 | Shumaker | 51—8 |

FOREIGN PATENTS

| 1,175,531 | 8/1964 | Germany | 51—11 |

LESTER M. SWINGLE, Primary Examiner

U.S. Cl. X.R.

15—310